2,935,496
POLYMERIZATION OF OLEFINS WITH COMPLEX CATALYST

James L. Jezl, Swarthmore, Pa., assignor to Sun Oil Company, Philadelphia, Pa., a corporation of New Jersey No Drawing. Application May 14, 1958
Serial No. 735,106

4 Claims. (Cl. 260—88.2)

This invention relates to the polymerization of olefins, and more particularly relates to the polymerization of normally gaseous olefins to high molecular weight solid polymers.

Catalytic systems effective for the polymerization of olefins such as propylene to solid polymers under relatively low temperature and pressure conditions have heretofore been described. For example, metal subhalides such as titanium trichloride, which can advantageously be prepared by reducing titanium tetrachloride with an organic aluminum compound such as an aluminum alkyl, are effective for such polymerizations. However, products obtained in the heretofore described processes contain, in addition to the desired high molecular weight polymers, substantial yields of relatively low molecular weight materials. Such low molecular weight polymers can be removed from the desired high molecular weight polymers by dissolution in a hydrocarbon such as n-pentane or n-hexane and the quantity of material soluble in such hydrocarbons indicates the yield of undesirable low molecular weight materials obtained in such processes. For example, such heretofore described processes generally produce yields of at least 15% or more of solid material soluble in n-heptane.

An object of the present invention is to provide a new catalyst effective for polymerizing olefins to high molecular weight polymers. Another object is to provide a catalytic system effective for polymerizing olefins to high molecular weight polymers without concomitant formation of substantial quantities of low molecular weight polymers. A further object is to provide a process for the polymerization of normally gaseous olefins to high molecular weight solid polymers.

It has now been found that by incorporating a halide of indium and a compound of a metal of group IV, V, VI or VIII of the periodic table in an inert, liquid medium, and introducing a reducing agent into the resulting system, as hereinafter described, a catalytic system especially effective for polymerizing olefins to high molecular weight solid polymers is produced.

Olefins which can be polymerized in accordance with the present invention are the alpha-olefins, i.e., olefins having a terminal olefinic bond. Generally olefins used have no more than about 12 carbon atoms, and normally gaseous olefins including ethylene, propylene, butene-1, butadiene-1,3, and mixtures thereof, give excellent results. The polymerization of propylene constitutes a preferred embodiment of the present invention, and hence the description of the invention hereinafter presented is largely directed to the polymerization of propylene.

In accordance with an embodiment of the invention, indium trichloride and titanium tetrachloride are incorporated in an inert, liquid medium and the resulting system is contacted with a reducing agent. On such contacting, a finely divided solid phase including a subchloride of titanium is formed as a dispersion in the solvent, and this solid phase constitutes a catalytic component of the present invention.

Suitable inert liquids to use in the catalyst preparation include hydrocarbons such as the hexanes, heptanes, octanes, decanes, cyclohexanes, and the like, aromatic hydrocarbons, such as benzene, toluene, and xylene, and chlorinated hydrocarbons such as chlorobenzenes and chloronaphthalenes, and mixtures thereof. The liquid medium used for the catalyst preparation can also be used as the polymerization reaction medium.

Although a halide of titanium, and particularly titanium tetrachloride, is a preferred material for use in the present invention, other metal compounds can be used. For example, metal compounds, preferably chlorides of the metals of groups IV, V, VI and VIII of the Periodic Table can be used. Preferably a chloride of zirconium, chromium, vanadium, molybdenum, hafnium, thorium, tantalum, tungsten, iron, cobalt or nickel is used. Compounds of manganese can also be used. Although chlorides are preferred, other compounds such as fluorides, oxyhalides and acetylacetonates can be used. Since titanium tetrachloride is a preferred material, the invention is herein largely described in terms thereof.

An indium halide is an essential component of the catalytic compositions of the invention and, as shown hereinafter, other metal halides cannot be substituted therefor. Indium trichloride is the preferred halide to use, but indium monochloride or dichloride can be used with good results, as can the bromine, fluorine and iodine analogues thereof. Mixtures of the same or different halides can also be used. The use of other metal halides, for example, the use of two chlorides of metals from groups IV, V, VI or VIII, one being used as the catalyst and the other as a substitute for indium trichloride does not give comparable results. Since indium trichloride is a preferred material, the invention is largely described in terms thereof.

Metal-containing compounds are used as the reducing agent, organo-metallic compounds such as aluminum triethyl, aluminum triisopropyl, aluminum tri-n-hexyl, ethyl aluminum dichloride combined with aluminum triethyl, and the like, being preferred, but other metal alkyls, alkyl metal halides and metal hydrides, and combinations thereof, can also be used, such as the corresponding alkyls of beryllium, chromium, magnesium, lithium and lead. Metal alkyl halides which can be used include methylmagnesium bromide, ethylmagnesium chloride and the like, and metal hydrides which can be used include lithium hydride, lithium aluminum hydride and sodium hydride. Such reducing compounds serve not only to reduce the titanium tetrachloride, but also as an activator in the resulting catalytic system. The use of an alkyl metal halide as a reducing agent, followed by the addition of a metal alkyl, as above described, form preferred embodiments of the invention.

The catalytic system of the invention is prepared as above-described, by dissolving or dispersing a chloride of indium and a compound of a metal of group IV, V, VI or VIII, or manganese, in an inert liquid. A reducing agent is then added to the system. The quantity of the reducing agent used should be sufficient to reduce at least a substantial portion of the metal compound, such as titanium tetrachloride, to a lower valence state. Generally from about 1 to 10 or more moles per mole of such metal compound plus the indium halide is used.

In a preferred embodiment of the invention, ethyl aluminum dichloride is first added as a reducing agent, and after reducing at least a substantial portion of the metal compound, the further addition of aluminum triethyl gives a catalytic system exhibiting especially high catalytic activity. For example, for each mole of titanium tetrachloride plus indium trichloride, from 1 to 5 moles of ethyl aluminum dichloride is added. From 0.2 to 10 moles of aluminum triethyl is then incorporated in the resulting system to give a preferred catalytic system in accordance with the invention.

The indium halide can be present in very small quantities and good results obtained. For example, from 0.05 to 12 moles of such metal halide per 100 moles of the group IV, V, VI or VIII metal compound, such as titanium tetrachloride, gives good results.

After performing the reduction step, an additional quantity of the inert liquid medium can be admixed therewith, if desired, to form a desired catalyst concentration. This concentration is not critical, and usually from about 500 to 5,000 parts of the liquid medium per part of catalyst is used. An olefin, preferably a normally gaseous olefin or mixture of such olefins, is then contacted with the catalytic system under polymerizing conditions. Contacting can be by bubbling the olefin into the suspension, or by introduction under pressure into an autoclave equipped with a mechanical stirrer and containing the polymerizing catalytic system. Substantially atmospheric temperatures and pressures are suitable, temperatures of from 0° C. to 200° C. being operable, and pressures of from below atmospheric to 5,000 p.s.i.g. (pounds per square inch gauge) giving good results. A mildly elevated temperature of from about 50° C. to 100° C. and mildly elevated pressures of from about 30 to 300 p.s.i.g. are preferred.

After completion of the polymerization reaction or when the polymerization has proceeded to a desired extent, the reaction is stopped and the polymer product recovered by any desired means. For example, an alcohol such as methanol can be added to the reaction mixture to kill the catalytic activity of the catalyst and to remove a major proportion of the inorganic catalytic components. If desired, aqueous or alcoholic solutions of mineral acids such as hydrochloric acid or nitric acid can be contacted with the polymer to insure substantial removal of the inorganic catalytic components.

The reason why the present catalytic system is remarkably effective for polymerizing olefins is not known with certainty. It is believed that the presence of the indium halide in the system during the reduction of titanium tetrachloride, or other metal compound as above-defined, in some way alters the crystal structure of the reduced compound, such as titanium trichloride, or that indium or a compound of indium is incorporated in the crystal, or is in some way attached to the solid reduced compound, thereby giving a remarkably effective system for polymerizing olefins.

The solid polymer products of the process are high molecular weight solids, i.e., are solids having molecular weights of above about 10,000 and usually of from about 100,000 to 500,000, and are characterized by containing only a small amount of low molecular weight n-heptane soluble polymers. When propylene is polymerized, for example, the products will contain less than about 10% of n-pentane soluble materials and less than 5% of n-heptane soluble materials (excluding n-pentane soluble materials). Using propylene, the preferred olefin of the invention, the n-heptane insoluble polymers have a regular configuration, are substantially crystalline, and have been designated "isotactic" polymers, while the n-heptane soluble polymers are generally of amorphous structure and have been designated "atactic" polymers. The isotactic polymers exhibit characteristics, such as relatively high melting points, which make them especially valuable, and hence high yields thereof are desired. With other olefins different solubilities are observed, but it is characteristic that the yields of relatively low molecular weight polymers are far below the yields thereof obtained in prior processes.

The following example illustrates the process of the invention:

Under substantially anhydrous and oxygen-free conditions, 0.15 gram of indium trichloride in pulverized form was contacted with 2.46 grams of liquid titanium tetrachloride, the quantity of indium trichloride being about 5 mole percent of the titanium tetrachloride, and the system was allowed to stand about 16 hours. A quantity of n-heptane was added to dissolve the titanium tetrachloride, and a quantity, about 6.2 grams, of ethyl aluminum dichloride was then added to reduce the tetrachloride. The mole ratio of ethyl aluminum dichloride to titanium tetrachloride plus indium trichloride was 3.6. On adding the ethyl aluminum dichloride a solid precipitate formed which was allowed to stand for about 30 minutes. To the resulting system were added about 2640 cc. of a mixture of paraffinic hydrocarbons consisting principally of octanes, a quantity of propylene so that the concentration thereof in the system was 55 mole percent, and 4.86 grams of aluminum triethyl. The temperature of the reaction mixture was maintained at about 32° C. for 2.5 hours. Methanol was then added to kill the catalytic activity and, after filtering, the polymer product was comminuted in the presence of methanol. After separation of methanol and methanol soluble materials, the polymer was extracted with n-pentane, extracted with n-heptane, and dried in an oven at from 90° C. to 95° C. for 2 hours. The rate of production of solid polymer was 0.13 pounds per gallon of reactor capacity per hour. The molecular weight was 366,000. The total pentane soluble materials was 10% and the $C_7$ soluble materials was 3%. Thus, 87% of the polymers produced were isotactic.

Repeating the above procedure, except omitting the indium trichloride results in a similar product which, however, contains 17.6% of materials soluble in n-pentane and 4 parts of material soluble in n-heptane. Thus, only 78.4% of the polymers produced were isotactic.

Various other chlorides were substituted for the indium trichloride in the above procedure, including chlorides of tin, vanadium, molybdenum, tungsten and chromium, and in none of these instances was any improvement observed and, particularly with tin chloride and vanadium chloride, such addition appeared to have a deleterious effect on the process especially in greatly hindering the rate of polymerization. Substituting other indium halides as above defined, however, gives good results which are substantially equivalent to the results above-obtained.

The invention claimed is:

1. A process for the polymerization of olefins which comprises contacting an olefin selected from the group consisting of ethylene, propylene, and butene-1, at a temperature of from 0° C. to 100° C. and at a pressure of from 30 to 300 p.s.i.g. with a catalyst prepared by incorporating titanium tetrachloride and from 0.05 to 12 mol percent, based on titanium tetrachloride, of indium trichloride in an inert liquid hydrocarbon medium, contacting the resultant system with from 1 to 5 mols, based on titanium tetrachloride plus indium trichloride, of aluminum ethyl dichloride, and then with 0.2 to 10 mols, also based on titanium tetrachloride plus indium trichloride, of an aluminum alkyl.

2. The process according to claim 1 in which the olefin is propylene.

3. A polymerization catalyst prepared by incorporating titanium tetrachloride and from 0.05 to 12 mol percent, based on titanium tetrachloride, of indium chloride in an inert liquid hydrocarbon medium, contacting the resultant system with from 1 to 5 mols, based on titanium tetrachloride plus indium trichloride, of aluminum ethyl dichloride, and then with from 0.2 to 10 mols, also based on titanium tetrachloride plus indium trichloride, of an aluminum alkyl.

4. The catalyst according to claim 3 in which the aluminum alkyl is aluminum triethyl.

References Cited in the file of this patent

UNITED STATES PATENTS

| | | |
|---|---|---|
| 2,827,447 | Nowlin et al. | Mar. 18, 1958 |
| 2,846,427 | Findlay | Aug. 5, 1958 |
| 2,868,771 | Ray et al. | Jan. 13, 1959 |
| 2,891,041 | Matlack | June 16, 1959 |